US012618349B2

(12) United States Patent
Bourgoin et al.

(10) Patent No.: US 12,618,349 B2
(45) Date of Patent: May 5, 2026

(54) LIQUID SUPPLY DEVICE FOR A MOTOR VEHICLE

(71) Applicant: Plastic Omnium Advanced Innovation and Research, Brussels (BE)

(72) Inventors: Rémy Bourgoin, Brussels (BE); Younes Nejnaoui, Brussels (BE); Damian Kruk, Brussels (BE); Yanis Chendouh, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/871,057

(22) PCT Filed: Jun. 7, 2023

(86) PCT No.: PCT/EP2023/065230
§ 371 (c)(1),
(2) Date: Dec. 2, 2024

(87) PCT Pub. No.: WO2023/237606
PCT Pub. Date: Dec. 14, 2023

(65) Prior Publication Data
US 2025/0354509 A1 Nov. 20, 2025

(30) Foreign Application Priority Data
Jun. 7, 2022 (BE) .................................. 2022/5437

(51) Int. Cl.
*F01N 3/20* (2006.01)
*B01D 35/18* (2006.01)
(Continued)

(52) U.S. Cl.
CPC ............. *F01N 3/206* (2013.01); *B01D 35/18* (2013.01); *B01D 35/26* (2013.01);
(Continued)

(58) Field of Classification Search
CPC ...... F01N 3/206; F01N 3/2066; F01N 13/009; F01N 2610/02; F01N 2610/10;
(Continued)

(56) References Cited

U.S. PATENT DOCUMENTS

| | | |
|---|---|---|
| 9,765,665 B2 | 9/2017 | Hodgson et al. |
| 2010/0175369 A1 | 7/2010 | Op De Beeck et al. |

(Continued)

FOREIGN PATENT DOCUMENTS

| | | | |
|---|---|---|---|
| CN | 105518266 B | 9/2018 | |
| DE | 102013211254 A1 * | 12/2014 | .......... F01N 3/2066 |
| KR | 10-2010-0046183 A | 5/2010 | |

OTHER PUBLICATIONS

International Search Report issued Sep. 4, 2023 in PCT/EP2023/065230, filed on Jun. 7, 2023, 2 pages.

*Primary Examiner* — Loren C Edwards
(74) *Attorney, Agent, or Firm* — Oblon, McClelland, Maier & Neustadt, L.L.P.

(57) ABSTRACT

A liquid supply device for a motor vehicle includes: a supply pump intended for pumping liquid from a liquid tank to a liquid consumption device, and a filtration assembly for filtering the liquid pumped by the supply pump. The filtration assembly includes a housing in which a filtration member is housed. The housing forms a siphon connected to a suction inlet of the supply pump and includes an open end intended to open into the liquid contained in the liquid tank such that a path of this liquid in the siphon passes through a high level, which, when the level of the liquid in the tank is below a predetermined threshold, is higher than the level of the liquid in the tank. The filtration member includes a filtration zone in the form of a pocket of filtration material extending vertically into the housing.

14 Claims, 4 Drawing Sheets

(51) Int. Cl.
    *B01D 35/26*     (2006.01)
    *B01D 53/94*     (2006.01)

(52) U.S. Cl.
    CPC .. *B01D 53/9431* (2013.01); *B01D 2251/2067*
        (2013.01); *B01D 2257/404* (2013.01); *B01D*
        *2258/01* (2013.01); *F01N 2610/10* (2013.01);
        *F01N 2610/1406* (2013.01); *F01N 2610/1426*
        (2013.01); *F01N 2610/1433* (2013.01)

(58) Field of Classification Search
    CPC ..... F01N 2610/1406; F01N 2610/1426; F01N
        2610/1433; F01N 2610/1486; B01D
        35/18; B01D 35/26; B01D 53/9431;
        B01D 2251/2067; B01D 2257/404; B01D
        2258/01
    See application file for complete search history.

(56) References Cited

U.S. PATENT DOCUMENTS

2014/0260206 A1\*   9/2014   Myer ........................ F01N 3/08
                          96/219
2015/0300230 A1\*   10/2015   Brueck ................ F01N 3/2066
                          137/61
2016/0341092 A1     11/2016   Daragon et al.

\* cited by examiner

Fig. 7

LIQUID SUPPLY DEVICE FOR A MOTOR VEHICLE

TECHNICAL FIELD OF THE INVENTION

The invention relates to a liquid supply device for a motor vehicle. The invention also relates to a liquid tank for a motor vehicle comprising a liquid supply device according to the invention. Additionally, the invention relates to a selective catalytic reduction device for a motor vehicle comprising a liquid tank according to the invention. Finally, the invention relates to a motor vehicle comprising a liquid tank according to the invention.

BACKGROUND ART

Already known in the state of the art are liquid supply devices for motor vehicles which are used, for example, to inject an additive solution, in particular an ammonia precursor, into the exhaust line of an internal combustion engine, in order to perform selective catalytic reduction (SCR). This selective catalytic reduction reduces the nitrogen oxides (NOx) emitted by light and heavy-duty vehicles equipped with internal combustion engines, thereby reducing the pollution caused by these vehicles to comply with legislation on nitrogen oxide emissions. Selective catalytic reduction requires the use of a reducing agent, such as ammonia, at a precise concentration level and of high quality. An ammonia precursor, such as urea, is generally used as an additive, and it must be precisely metered and injected into the exhaust gas stream, where it is hydrolyzed before converting nitrogen oxides (NOx) into nitrogen ($N_2$) and water ($H_2O$). To do this, it is necessary to equip the vehicles with a tank containing an additive solution, as well as a device for metering and injecting the desired quantity of additive into the exhaust line.

In order to prevent the additive solution injector from becoming blocked with impurities that can be found in the additive solution, it is known to filter the additive solution before it is injected. In the prior art, a filtration member is arranged in the additive tank at the inlet of a supply pump for supplying the additive solution allowing the additive solution to be pumped through the filtration member. Through this arrangement, the additive solution is cleaned of its impurities before it is injected into the exhaust line, upstream of the catalyst for the selective catalytic reduction. This also protects the supply pump from impurities in the aspirated additive solution.

After a certain period of use, impurities clog the filtration member. Clogging occurs even faster when the impurities are numerous and large. This is particularly true in highly polluted areas. As the level of clogging increases, the filtration capacity of the filtration member decreases and the filtration flow rate of the liquid through the filtration member falls below the suction flow rate of the supply pump. As a result, the pump draws in all or part of the air, causing the supply pump to lose liquid injection pressure. The result is difficulties in accurately metering the injected additive, and therefore a reduction in the efficiency of selective catalytic reduction. The lower the liquid level in the tank, the more air is sucked in, exposing part of the filtration member to the air.

SUMMARY OF THE INVENTION

One of the aims of the invention is to reduce the risk of loss of liquid injection pressure in a liquid supply device for a motor vehicle over time.

To this end, the invention relates to a liquid supply device for a motor vehicle, comprising:

- a supply pump intended for pumping liquid from a liquid tank to a liquid consumption device, and
- a filtration assembly intended for filtering the liquid pumped by the supply pump, the filtration assembly comprising a housing in which a filtration member is housed, in which the housing forms a siphon connected to a suction inlet of the supply pump and includes an open end intended to open into the liquid contained in the liquid tank such that a path of this liquid in the siphon passes through a so-called high level, which, when the level of the liquid in the liquid tank is below a predetermined threshold, is higher than the level of the liquid in the liquid tank, characterized in that the filtration member comprises a filtration zone in the form of a pocket of filtration material extending vertically into the housing forming the siphon.

Thus, when the supply pump is primed, it first sucks the air out of the housing forming the siphon. This air suction creates a negative pressure which raises the liquid level in the siphon, immersing the filtration member in the liquid. As a result, at the end of the supply pump priming period, the filtration member is no longer in contact with air or, at the very least, the filtration member remains sufficiently immersed, even when the liquid level in the tank is below the predetermined threshold, to prevent the supply pump from drawing in air during operation. In addition, the immersion of the filtration member remains high, even when the liquid level in the tank is low, effectively limiting the clogging effect of the filtration member, preventing liquid from passing through it.

The fact that the supply pump does not suck in air during operation prevents any instability or loss of pressure for the liquid injection performed by the supply pump. This is particularly advantageous in cases where the liquid injected by the pump needs to be precisely metered, for example where the liquid is an ammonia precursor for injection into the exhaust line of an internal combustion engine for use as an additive in a selective catalytic reduction reaction. The liquid supply device can be used with other liquids, such as water or fuel.

It is understood that the liquid supply device according to the invention makes it possible to use large filtration members without risking a reduction in liquid injection pressure by the supply pump, since the filtration member is no longer in contact with air or, at least, the filtration member remains sufficiently immersed.

Furthermore, since the air in the housing is expelled when the supply pump is primed, the degree of clogging of the filtration member has little impact on the liquid filtration rate, since the filtration member is not in contact with air and can therefore only filter liquid. In this way, the liquid supply device according to the invention remains functional even in the event of severe clogging of the filtration member. This extends the life of the filtration member, particularly in polluted areas where it tends to clog up quickly.

The housing forming the siphon, by virtue of its function, comprises a wall that is airtight and impervious to the liquid in the tank. In this way, the filtration member is further protected from impurities that may be present in the liquid stored in the tank, thereby increasing the service life of the filtration member. In particular, any oily residues present in the liquid remain on its surface and are thus blocked by the housing forming the siphon, preventing them from reaching the filtration member.

"Impurities" refer to any foreign body relative to the liquid, for example, dust, dirt, insects, chips from the tank, oils or solid particles. These foreign bodies can be floating, suspended or deposited at the bottom of the liquid tank.

The passage of the liquid through a so-called high level enables the filtration member to be immersed in the liquid to a significant extent, whatever the tank filling level, within the limit of a minimum filling level.

The predetermined threshold corresponds, for example, to the liquid level in the tank at which at least part of the housing forming the siphon is no longer submerged. Preferably, the predetermined threshold corresponds to the liquid level in the housing forming the siphon at which the filtration member is no longer in contact with the air. This ensures that the filtration member remains sufficiently immersed in the liquid even when the liquid level in the tank is lower than the so-called high level inside the housing.

It is understood that a "pocket" comprises at least one wall delimiting a cavity open at one of its ends and closed at another of its ends forming a bottom of the pocket. According to the present invention, it is understood that the wall of the pocket is made of filtration material and that liquid can be filtered through this wall into the interior of the pocket.

Since the filtration zone in the form of a pocket extends vertically into the housing, when the pocket is fully immersed in liquid, for example once the pump has been primed and the air has been expelled from the housing, the available filtration surface is optimized because all pocket faces, over all their heights and widths, can be used to filter liquid that has not yet been filtered. This makes it possible to provide a particularly compact filtration assembly and therefore a liquid supply device that is also more compact.

The invention may also comprise one or more of the following optional features, taken alone or in combination.

The ratio V/h, where V is the volume of the filtration member and h is the height of the filtration member, is between 400 mm$^2$ and 800 mm$^2$; preferably the ratio V/h is about 600 mm$^2$. This ratio represents the filtering surface of the filtration member. Such filtration members have good filtration properties. The presence of the housing forming the siphon makes it possible to use such filtration members. A filtration member with these dimensions has good filtration properties, but with prior art liquid supply devices, there is a significant risk of loss of liquid injection pressure due to its large volume, which can easily fill with air. The liquid supply device according to the invention enables air to be expelled from the housing forming the siphon during priming, so that the use of such filtration members is possible without encountering this problem.

The liquid supply device further comprises a supply pipe extending vertically into the pocket between high and low points of the pocket, a first high end of the supply pipe being connected to the suction inlet of the supply pump and a second low end opening into the interior of the pocket. This is a simple way of facilitating pump suction, in particular by allowing liquid to be drawn in close to the liquid level in the housing forming the siphon.

Preferably, the distance A between the second low end of the supply pipe and the bottom of the pocket is between 10 and 90% of the height p of the pocket, more preferably, the distance A is about 25% of the height p of the pocket. This positioning of the second low end of the supply pipe optimizes liquid suction by the supply pump through the supply pipe, whether during pump priming or subsequent suction.

The pocket comprises at least two lateral filtration faces, each lateral filtration face being arranged facing and at a distance from a wall of the housing. This optimizes the surface area available for filtration. Indeed, it is understood that in this arrangement the lateral filtration faces are not in contact with the wall of the housing and can therefore be in direct contact with liquid that has not yet been filtered. In this way, liquid can enter the pocket not only through the bottom of the pocket but also through the lateral filtration faces. This increases the filtration zone of the filtration member. Depending on the design, the number of lateral faces can be different, for example between two and six.

The liquid supply device comprises means for heating the housing forming the siphon. In this way, any liquid that may have frozen in the housing forming the siphon can be thawed to enable the liquid supply device to be used. It is noted that the heating means only have to heat the volume of liquid present in the housing forming the siphon. This reduced volume facilitates thawing of the liquid inside.

The supply pump is housed in a casing, with the filtration assembly arranged outside the casing and supported by it. The casing enables the various functional units of the liquid supply device to be grouped together and connected to one another simply and efficiently. This facilitates the manufacture of the liquid supply device and results in a compact liquid supply device.

Preferably, the liquid supply device further comprises means for releasably attaching the filtration assembly to the casing. This facilitates maintenance of the liquid supply device. This makes it easy to disconnect the filtration assembly from the casing, for example, to check the condition of the filtration member, and in particular its degree of clogging. This also makes it easy to replace the filtration member when required. In particular, it is possible to replace the filtration member without having to manipulate the rest of the liquid supply device, in particular the supply pump. This reduces the risk of wear on the rest of the supply device, thereby increasing its service life. The removable attachment means can consist of any means known to the skilled person for quickly and easily attaching and detaching the filtration assembly from the casing. Preferably, these removable attachment means do not require the use of a tool to attach or detach the filtration assembly from the casing. For example, the removable attachment means are clip-on or screw-on attachment means enabling the filtration assembly to be clipped or screwed directly onto the casing. Screw-on attachment means that the filtration assembly comprises a thread that complements a thread on the casing, so that the filtration assembly can be screwed directly onto the casing. Preferably, the threads of the filtration assembly and the casing form quarter-turn screw-type attachment means, enabling the filtration assembly to be attached to and detached from the casing by applying a quarter-turn, or 90°, rotation to the filtration assembly. This makes it particularly easy to attach and detach the filtration assembly, even when maneuvering space is limited.

The liquid is an aqueous solution, preferably an ammonia precursor. If the liquid is an ammonia precursor, the liquid supply device can be advantageously used as part of a selective catalytic reduction reaction to purify exhaust gases from an internal combustion engine. According to another embodiment, the aqueous solution is water.

The invention also relates to a liquid tank for a motor vehicle equipped with a liquid supply device as described previously. Thus, depending on the embodiment, the tank may be, for example, a tank for an aqueous solution such as water or urea, or a fuel tank. The tank according to the invention can be made of any material. In the particular case of a tank with urea solution, the material of the tank is preferably a material having good chemical resistance to urea. It is generally plastic. Polyolefins, in particular polyethylene and, more particularly, high-density polyethylene (HDPE), constitute preferred materials. This tank can be produced by any known transformation method. A known embodiment is the injection molding method. A preferred embodiment is the extrusion-blow molding method. In this method, a parison—in one or several parts—is obtained by extrusion and then blow-forming in a mold. Molding the tank in one piece from a parison in a single part yields good results.

The invention also relates to a selective catalytic reduction device for purifying exhaust gases from a motor vehicle internal combustion engine, the selective catalytic reduction device comprising a liquid tank as previously described, wherein the liquid is an ammonia precursor. The ammonia precursor is urea, for example. The catalytic reduction device is thus improved, since it is equipped with a liquid supply device according to the invention, which reduces the risk of loss of injection pressure of the ammonia precursor over time. This is particularly advantageous since, as previously mentioned, it is important to accurately meter the injected ammonia precursor in selective catalytic reduction, and the loss of injection pressure of the ammonia precursor impairs the accuracy of this metering.

Finally, the invention also relates to a vehicle comprising a liquid tank as previously described.

BRIEF DESCRIPTION OF THE FIGURES

The invention will be better understood upon reading the following description, which is provided merely by way of non-limiting example and with reference to the appended drawings, wherein:

FIG. 7 is a schematic representation of the operation of the liquid supply device shown in FIG. 1.

DETAILED DESCRIPTION

Figure 1:
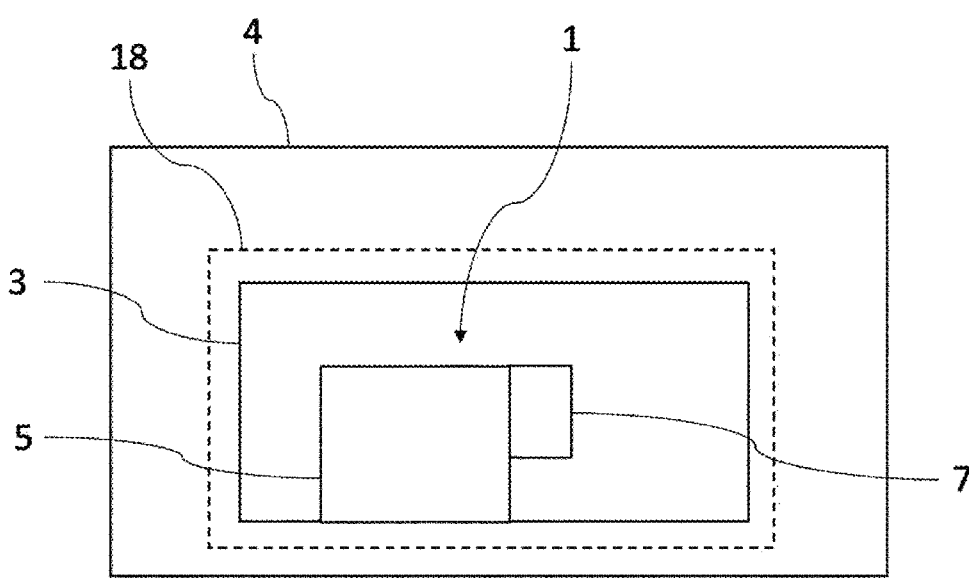
FIG. 1 is a schematic representation of a vehicle comprising a tank equipped with a liquid supply device according to the invention.

FIGS. 1 to 7 show an embodiment of a liquid 2 supply device 1 according to the invention. In the present case, the liquid 2 supply device 1 is mounted on a bottom wall of a liquid tank 3 which is itself mounted on a motor vehicle 4 (FIG. 1).

In this case, the liquid is an ammonia precursor, such as urea. The liquid tank 3 and the liquid supply device 1 thus form part of a selective catalytic reduction device 18 designed to purify exhaust gases from an internal combustion engine (not shown) of the motor vehicle 4.

The material from which the liquid tank 3 is made is preferably a material with good chemical resistance to urea. It is generally plastic. Polyolefins, in particular polyethylene and, more particularly, high-density polyethylene (HDPE), constitute preferred materials. This tank can be produced by any known transformation method. A known embodiment is the injection molding method. A preferred embodiment is the extrusion-blow molding method. In this method, a parison—in one or several parts—is obtained by extrusion and then blow-forming in a mold. Molding the tank in one piece from a parison in a single part yields good results.

The liquid 2 supply device 1 in particular comprises a casing 5, a supply pump 6 and a filtration assembly 7 (FIGS. 2, 3, 4 and 7).

Figure 2:
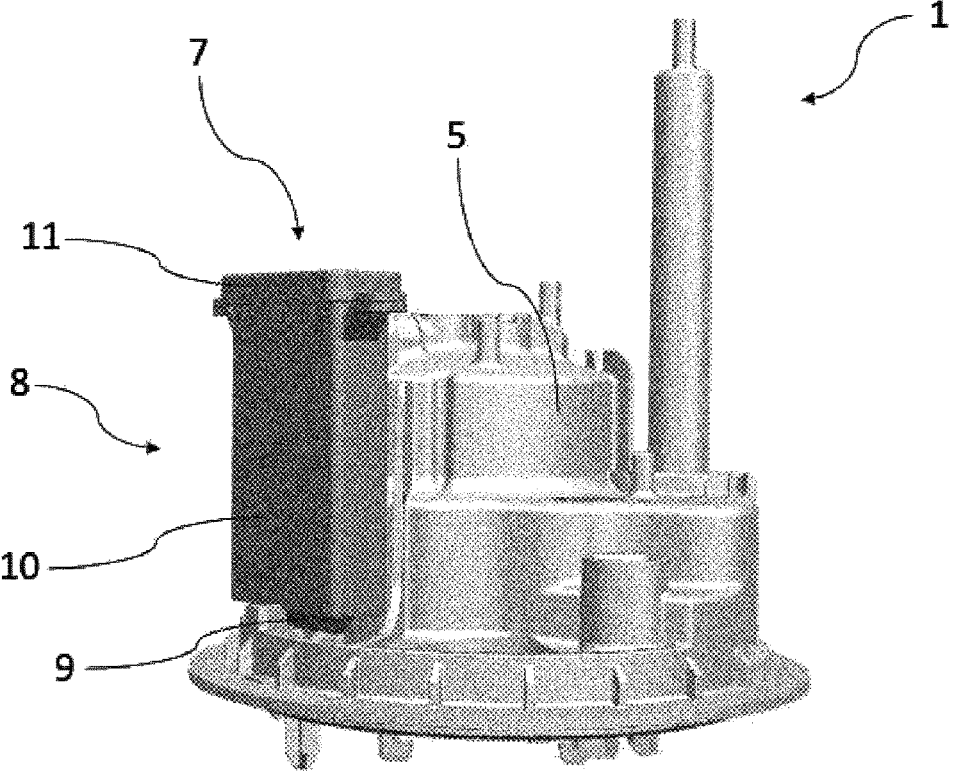
FIG. 2 is a perspective view of the liquid supply device shown in FIG. 1.

The casing 5 forms a support member for the various functional units of the liquid 2 supply device 1. In the present case, the supply pump 6 is housed inside the casing 5, and the filtration assembly 7 is arranged outside the casing 5 and supported by this casing 5 (FIG. 2). More particularly, the liquid 2 supply device 1 comprises means (not shown) for removably attaching the filtration assembly to the casing 5. Preferably, these removable attachment means do not require the use of a tool to attach or detach the filtration assembly 7 and the casing 5. For example, the removable attachment means are clip-on or screw-on attachment means enabling the filtration assembly 7 to be clipped or screwed directly onto the casing 5.

The other functional units of the liquid 2 supply device 1 are conventional and are not shown for the sake of clarity. The casing 5 can be made of any material with good chemical resistance to urea. For example, the casing 5 is made of thermoplastic material.

The supply pump 6 is intended for pumping liquid from the liquid tank 3 to a liquid consumption device (not shown). In this case, since the liquid is an ammonia precursor, the liquid consumption device is a selective catalytic reduction reaction catalyst. It is understood that the liquid consumption device is different depending on the desired use of the liquid 2 supply device 1, and more particularly depending on the nature of the liquid 2 contained in the liquid 2 tank 3. The supply pump 6 used is well known in its own right and will not be disclosed in further detail here. It is understood that the supply pump 6 may correspond in particular to a supply pump 6 conventionally used for injecting ammonia precursor as part of a selective catalytic reduction reaction in a motor vehicle 4.

Figures 3, 4:
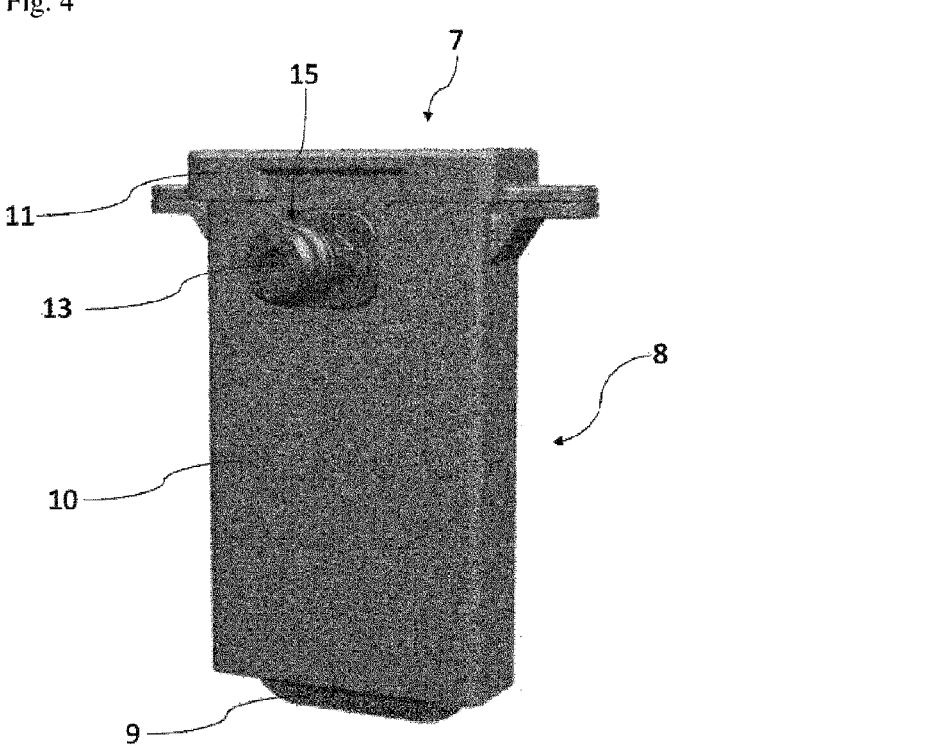
FIG. 3 is a cross-sectional view of part of the liquid supply device shown in FIG. 1.
FIG. 4 is a perspective view of a filtration assembly forming part of the liquid supply device of FIG. 1.

The filtration assembly 7 is designed to filter the liquid 2 pumped by the supply pump 6 to ensure that the liquid 2 injected into the selective catalytic reduction reaction is substantially free of impurities. The filtration assembly 7 in particular comprises a housing 8 in which a filtration member 9 is housed (FIG. 4).

The housing 8 has a generally parallelepiped shape with a closed first longitudinal end and an open second longitudinal end opposite the first longitudinal end. In the present case, the housing 8 is formed in two parts, a first part forming the main body 10 of the housing 8 and a second part forming a closing cover 11 designed to seal the first longitudinal end of the housing 8 so as to be airtight and impervious to the liquid 2 present in the liquid tank 3. Alternatively, the housing 8 can be manufactured so that the body 10 and the cover 11 are made in one piece.

The housing 8 forms a siphon which is connected to a suction inlet 12 of the supply pump 6 at its first closed longitudinal end via a supply pipe 13. The second open longitudinal end of the housing 8 forming the siphon opens into the liquid 2 contained in the liquid 2 tank 3 so that a path of this liquid 2 through the siphon passes through a so-called high level, which, when the liquid level in the liquid tank 3 is below a predetermined threshold, is higher than the level of the liquid 2 in the liquid 2 tank 3 (see FIG. 7). For example, the predetermined threshold may be located substantially at the first open longitudinal end of the housing 8 forming the siphon. Preferably, the predetermined threshold corresponds to the liquid level in the housing 8 forming the siphon at which the filtration member 9 is immersed in the liquid 2.

Figure 5:
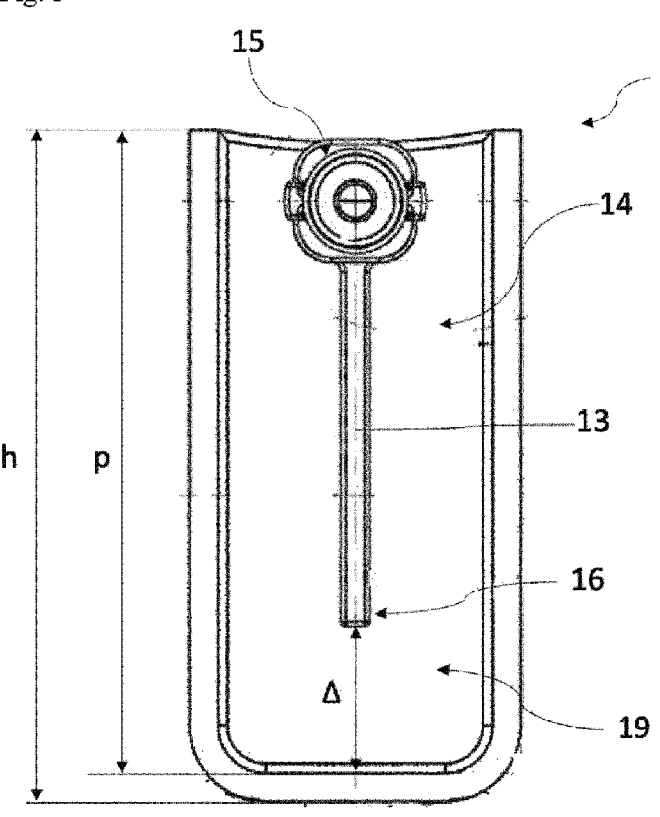
FIG. 5 is a front view of part of the filtration assembly shown in FIG. 4.
Figure 6:
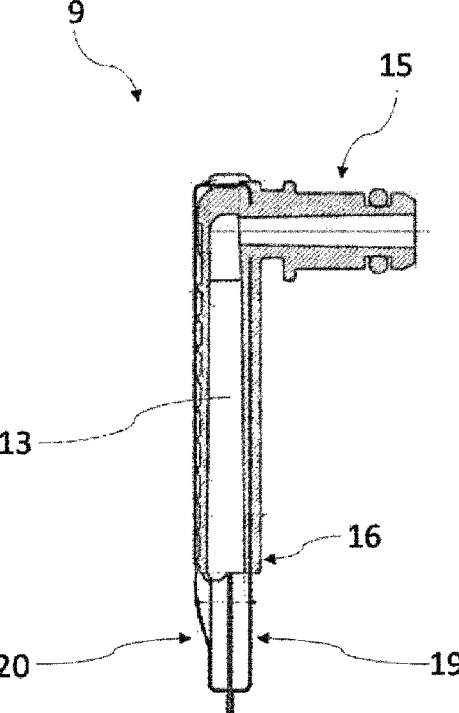
FIG. 6 is a longitudinal cross-sectional view of the part of the filtration assembly shown in FIG. 5.

The filtration member 9 is made from a flexible filtering mesh attached to a rigid reinforcement. The filtering mesh is flexible and is wound, for example, over or under the rigid reinforcement. Advantageously, the filtering mesh and the rigid reinforcement are made of thermoplastic material and are welded together. Alternatively, the flexible filtering mesh is manufactured as a single piece with the rigid reinforcement (FIGS. 5 and 6).

Figure 7:
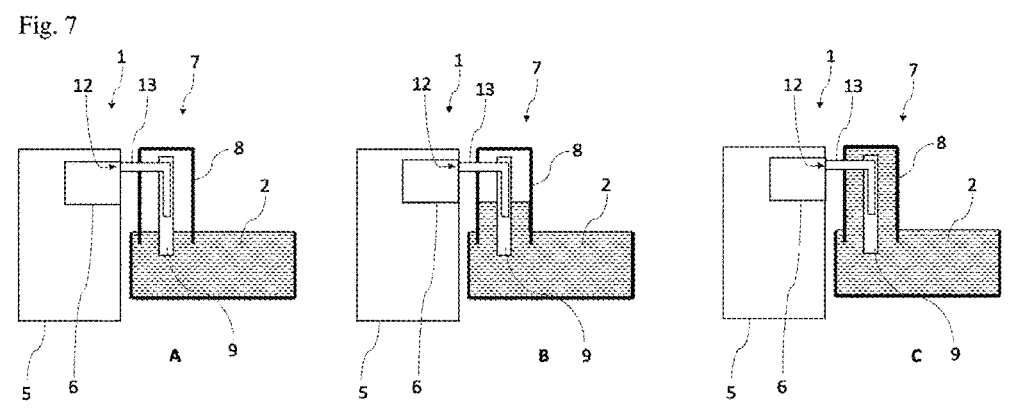

The filtration member 9 comprises a filtration zone that extends vertically into the housing 8 forming the siphon. In other words, the filtration member 9 is arranged vertically in the housing 8, which is also arranged vertically when mounted on the casing 5 (FIGS. 2, 3 and 7). In particular, the filtration zone of the filtration member 9 comprises a pocket 14 of filtration material formed by the filtering mesh.

The pocket 14 comprises at least one wall delimiting a cavity open at one of its ends and closed at another of its ends forming a bottom of the pocket. In the present case, the opening in the pocket 14 allows the supply pipe 13 to pass through. According to the present embodiment, the pocket 14 comprises two lateral filtration faces 19, 20, each lateral filtration face 19, 20 being arranged facing and at a distance from a wall of the housing 8 (FIGS. 3 and 7).

In the present case, the ratio V/h, where V is the volume of the filtration member 9 and h is the height of the filtration member 9, is between 400 mm² and 800 mm², preferably the ratio V/h is about 600 mm². In the present embodiment, the filter pocket 14 has a height p of about 68 mm, which is slightly less than the height h of the filtration member (FIG. 5).

The supply pipe 13 has a generally inverted "L" shape and extends vertically into the pocket 14 between high and low points of the pocket 14. A first, upper end 15 of the supply pipe 13 is connected to the suction inlet 12 of the supply pump 6, thus bringing the interior of the housing 8 forming the siphon into fluid communication with the suction inlet 12 of the supply pump 6 (FIGS. 3 and 7). A second low end 16 of the supply pipe 13 opens into the pocket 14 (FIGS. 5 and 6). Depending on the design, the height at which the second low end 16 of the supply pipe 13 opens into the pocket 14 varies. In the present case and advantageously, the distance A between the second low end 16 of the supply pipe 13 and the bottom of the pocket 14 is approximately 15.5 mm, which represents approximately 23% of the height p of the pocket 14 (FIG. 5). Advantageously, the distance A between the second low end 16 of the supply pipe 13 and the bottom of the pocket 14 is between 10% and 90%, preferably the distance A is approximately equal to 25% of the height of the pocket.

The liquid supply device 1 further comprises means 17 for heating the housing 8 forming the siphon. In the present case, these heating means 17 are formed by a heating mat partially covering the housing 8 forming the siphon. According to other embodiments, any heating means capable of being arranged inside a liquid 2 tank 3 to heat the housing 8 forming the siphon can be used. For the sake of clarity, the heating means 17 are shown only in FIG. 3.

With reference to FIG. 7, an operating example of the liquid 2 supply device 1 according to the invention is disclosed below.

As previously mentioned, the liquid 2 supply device 1 is used in this case for a selective catalytic reduction reaction to inject liquid 2, in this case an ammonia precursor, into the exhaust gas stream of the motor vehicle 4, where it is hydrolyzed to convert nitrogen oxides (NOx) into nitrogen ($N_2$) and water ($H_2O$).

FIG. 7A shows the state of the liquid 2 supply device 1 prior to use, that is, before the supply pump 6 is switched on. Here, the level of liquid 2 in the liquid tank 3 is relatively low, so that a significant portion of the filtration assembly 7, and in particular the housing 8 forming the siphon, is not immersed in the liquid 2. Air is present inside the housing 8 forming the siphon.

When injection of liquid 2 into the exhaust gas stream is required, the supply pump 6 is activated. In a first priming stage, the supply pump 6 sucks in a mixture of air present in the housing 8 forming the siphon and liquid 2 via its suction inlet 12 and along the supply pipe 13. The suction of the air creates a negative pressure which increases the level of liquid 2 inside the housing 8 forming the siphon (FIG. 7B).

At the end of the priming period, all or most of the air that was present inside the housing 8 forming the siphon has been sucked out by the supply pump 6, so that the housing 8 forming the siphon is filled with liquid 2 at least to such an extent that the filtration member 9 is completely or almost completely immersed (FIG. 7C). It is noted that the level of liquid 2 in the housing 8 forming the siphon is higher than the level of liquid 2 in the liquid 2 tank 3. The filtration member 9 is then immersed in the liquid and not in contact with air. At this point, the supply pump 6 can no longer, or hardly any longer, draw in air. This reduces or eliminates the risk of loss of injection pressure for the liquid 2. Additionally, immersion of the filtration member 9 after pump priming is achieved regardless of the degree of clogging of the filtration member 9. Thus, even if the filtration member 9 is very clogged, it is possible to continue using this filtration member 9 with a liquid 2 supply device 1 according to the invention, since the air has been expelled from the housing 8 forming the siphon, and can therefore no longer be drawn in by the supply pump 6 and cause a drop in injection pressure of the liquid 2.

Examples

The results of a test designed to measure the efficiency of the liquid 2 supply device 1 according to the invention based on the level of clogging of the filtration member 9 are described below. The filtration members 9 were thus tested for a clogging level, as a percentage of the height h of the filtration member 9, of 0% (control), 10%, 20%, 30%, 40% and 50%. To control the level of clogging, this was artificially achieved by covering the filtration member 9 with an epoxy resin to a height corresponding to the percentage of clogging level desired, starting from the low end of the filtration member 9. The efficiency of the liquid 2 supply device 1 according to the invention was tested by measuring the quantity of aqueous solution, in this case urea, that can be injected using the filtration member 9 alone, as is the case in the prior art, or housed in a housing 8 forming the siphon of a filtration assembly 7 according to the invention. The test results are shown in Table 1.

TABLE 1

| Clogging level | Volume of urea to be injected (kg) | Volume of urea injected with a prior art liquid supply device (kg) | Volume of urea injected with a liquid supply device according to the invention (kg) |
|---|---|---|---|
| 0% | 5.000 | 4.821 | Not applicable (NA) |
| 10% | 5.000 | 4.540 | 4.824 |
| 20% | 5.000 | 4.459 | 4.844 |
| 30% | 5.000 | 3.685 | 4.821 |
| 40% | 5.000 | 3.343 | 4.810 |
| 50% | 5.000 | 3.247 | 4.841 |

The urea volume is measured in kilograms rather than liters, to facilitate measurement. Alternatively, this test could be carried out by measuring the volume of urea in liters. According to this test, 5 kg of urea is to be injected by a liquid 2 supply device 1 comprising either a filtration member alone (case representing the prior art), or a filtration assembly 7 according to the invention in which the filtration member 9 is housed in a housing 8 forming the siphon.

The case where the clogging level is 0% was tested only on the prior art liquid supply device to provide a reference value. Thus, in the prior art, with a filtration member that is not clogged, generally because it is new, the volume of urea injected from 5 kg of urea is 4.821 kg.

When the filtration member 9 is 10% clogged, there is a reduction in urea injection for the prior art liquid supply device. The volume of urea injected is 4.540 kg instead of 4.821 kg when the filtration member 9 is not clogged, that is, a loss of 0.281 kg of urea. This drop is not visible with the liquid 2 supply device 1 according to the invention, since 4.824 kg of urea was injected. There was even a slight increase in the volume of urea injected compared with the control case (an increase of 0.003 kg). At 10% clogging, the filtration capabilities of the filtration assembly 7 according to the invention are therefore better than those of the prior art and enable a filtration level to be maintained which is substantially equivalent to a filtration level obtained when the filtration member 9 is new.

When the filtration member 9 is 20% clogged, there is again a reduction in urea injection for the prior art liquid supply device. The volume of urea injected is 4.459 kg instead of 4.821 kg when the filtration member 9 is not clogged, that is, a loss of 0.362 kg of urea. Once again, this drop is not visible with the liquid 2 supply device 1 according to the invention, since 4.844 kg of urea was injected. Again, there was a slight increase in the volume of urea injected compared with the control case (an increase of 0.023 kg). At 20% clogging, the filtration capabilities of the filtration assembly 7 according to the invention are therefore better than those of the prior art and enable a filtration level to be maintained which is substantially equivalent to a filtration level obtained when the filtration member 9 is new.

When the filtration member 9 is 30% clogged, there is again a reduction in urea injection for the prior art liquid supply device. The volume of urea injected is 3.685 kg instead of 4.821 kg when the filtration member 9 is not clogged, that is, a loss of 1.136 kg of urea. Once again, this drop is not visible with the liquid 2 supply device 1 according to the invention, since 4.821 kg of urea was injected, or as much as with a new filtration member 9. At 30% clogging, the filtration capabilities of the filtration assembly 7 according to the invention are therefore better than those of the prior art and enable a filtration level to be maintained which is substantially equivalent to a filtration level obtained when the filtration member 9 is new.

When the filtration member 9 is 40% clogged, there is again a reduction in urea injection for the prior art liquid supply device. The volume of urea injected is 3.343 kg instead of 4.821 kg when the filtration member 9 is not clogged, that is, a loss of 1.478 kg of urea. This drop is not very significant with the liquid 2 supply device 1 according to the invention, since 4.810 kg of urea was injected, or a loss of only 0.011 kg of urea. At 40% clogging, the filtration capabilities of the filtration assembly 7 according to the invention are therefore better than those of the prior art and enable a filtration level to be maintained which is substantially equivalent to a filtration level obtained when the filtration member 9 is new.

When the filtration member 9 is 50% clogged, there is again a reduction in urea injection for the prior art liquid supply device. The volume of urea injected is 3.247 kg instead of 4.821 kg when the filtration member 9 is not clogged, that is, a loss of 1.574 kg of urea. Once again, this drop is not present with the liquid 2 supply device 1 according to the invention, since 4.841 kg of urea was injected, or an increase of 0.020 kg of urea relative to the control case. At 50% clogging, the filtration capabilities of the filtration assembly 7 according to the invention are therefore better than those of the prior art and enable a filtration level to be maintained which is substantially equivalent to a filtration level obtained when the filtration member 9 is new.

This test enables conclusions to be drawn about the filtration efficiency of a filtration member 9 over time, that is, as it becomes clogged. The loss of filtration efficiency for prior art filtration members corresponds in practice to an increased risk of loss of injection pressure during use of the liquid 2 supply device 1. As already mentioned, this loss of injection pressure is disadvantageous, particularly in cases where the quantity of liquid 2 to be injected needs to be precisely metered, since it does not allow an acceptable level of precision to be achieved with regard to the quantity of liquid 2 injected. This test shows that the use of a device 1 for supplying liquid 2 in accordance with the invention preserves the filtration capacity of the filtration member 9 over time, even in the event of heavy clogging, and thus reduces the risk of loss of injection pressure for the liquid 2 over time.

The invention is not limited to the embodiment presented, and other embodiments will become clearly apparent to those skilled in the art.

LIST OF REFERENCES

1: liquid supply device
2: liquid
3: tank
4: motor vehicle
5: casing
6: supply pump
7: filtration assembly
8: housing
9: filtration member
10: housing body
11: housing cover
12: supply pump suction Inlet
13: supply pipe
14: filtration member pocket
15: first high end of supply pipe
16: second low end of supply pipe
17: heating means for the housing forming the siphon
18: selective catalytic reduction device 19, 20: filtration side faces h: height of filtration member p: filter pocket height Δ: distance between the second low end of the supply pipe and the bottom of the pocket

The invention claimed is:

1. A liquid supply device for a motor vehicle, comprising:
a supply pump configured to pump a liquid from a liquid tank to a liquid consumption device, and
a filtration assembly configured to filter the liquid pumped by the supply pump, the filtration assembly comprising a housing in which a filtration member is housed,
wherein the housing forms a siphon connected to a suction inlet of the supply pump and comprises an open end configured to open into the liquid contained in the liquid tank such that a path of the liquid in the siphon passes through a high level,
wherein, when a level of the liquid in the liquid tank is below a predetermined threshold, the liquid in the siphon passing through the high level is higher than the level of the liquid in the liquid tank,
wherein the filtration member comprises a filtration zone configured as a pocket of filtration material extending vertically into the housing forming the siphon, and
wherein the liquid supply device further comprises a supply pipe extending vertically into the pocket between high and low points of the pocket, a first high end of the supply pipe being connected to the suction inlet of the supply pump and a second low end opening into an interior of the pocket.

2. The liquid supply device according to claim 1, wherein a ratio V/h, where V is a volume of the filtration member and h is a height of the filtration member, is between 400 mm$^2$ and 800 mm$^2$.

3. The liquid supply device according to claim 2, wherein the ratio V/h is 600 mm$^2$.

4. The liquid supply device according to claim 1, wherein a distance between the second low end of the supply pipe and a bottom of the pocket is between 10 and 90% of a height of the pocket.

5. The liquid supply device according to claim 4, wherein the distance between the second low end of the supply pipe and the bottom of the pocket is 25% of the height of the pocket.

6. The liquid supply device according to claim 1, wherein the pocket comprises at least two lateral filtration faces, each lateral filtration face of the at least two lateral filtration faces being arranged facing and at a distance from a wall of the housing.

7. The liquid supply device according to claim 1, comprising means for heating the housing forming the siphon.

8. The liquid supply device according to claim 1, wherein the supply pump is housed in a casing, the filtration assembly being arranged outside the casing and supported by the casing.

9. The liquid supply device according to claim 8, further comprising means for releasably attaching the filtration assembly to the casing.

10. The liquid supply device according to claim 1, wherein the liquid is an aqueous solution.

11. The liquid supply device according to claim 10, wherein the liquid is an ammonia precursor.

12. A liquid tank for a motor vehicle, wherein the liquid tank is equipped with the liquid supply device according to claim 1.

13. A selective catalytic reduction device for purifying exhaust gases from an internal combustion engine of a motor vehicle, wherein the selective catalytic reduction device comprises the liquid tank according to claim 12, wherein the liquid is an ammonia precursor.

14. A motor vehicle, wherein the motor vehicle comprises the liquid tank according to claim 12.

* * * * *